(12) United States Patent
Yu et al.

(10) Patent No.: US 12,447,997 B2
(45) Date of Patent: Oct. 21, 2025

(54) MERGING LANE LINE MAPS FOR A VEHICLE

(71) Applicant: GM Global Technology Operations LLC, Detroit, MI (US)

(72) Inventors: Bo Yu, Troy, MI (US); Gui Chen, Sterling Heights, MI (US); Fan Bai, Ann Arbor, MI (US); Shuqing Zeng, Sterling Heights, MI (US); Joon Hwang, Pflugerville, TX (US); Mason David Gemar, Cedar Park, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 201 days.

(21) Appl. No.: 18/364,505

(22) Filed: Aug. 3, 2023

(65) Prior Publication Data

US 2025/0042433 A1 Feb. 6, 2025

(51) Int. Cl.
| | |
|---|---|
| *B60W 60/00* | (2020.01) |
| *G01C 21/00* | (2006.01) |
| *G06T 11/60* | (2006.01) |
| *G06V 20/56* | (2022.01) |

(52) U.S. Cl.
CPC ....... *B60W 60/001* (2020.02); *G01C 21/3822* (2020.08); *G06T 11/60* (2013.01); *G06V 20/588* (2022.01); *B60W 2556/50* (2020.02)

(58) Field of Classification Search
CPC ............ B60W 60/001; B60W 2556/50; G01C 21/3822; G01C 21/3658; G01C 21/3819; G06T 11/60; G06V 20/588
See application file for complete search history.

(56) References Cited

U.S. PATENT DOCUMENTS

| | | | |
|---|---|---|---|
| 6,385,539 B1 * | 5/2002 | Wilson | G08G 1/0129 340/905 |
| 8,868,335 B2 * | 10/2014 | Nowak | G09B 29/10 701/445 |
| 11,326,889 B2 | 5/2022 | Kim | |
| 2004/0114379 A1 | 6/2004 | Miller et al. | |

(Continued)

FOREIGN PATENT DOCUMENTS

| | | |
|---|---|---|
| CN | 111651547 A | 9/2020 |
| DE | 102021121834 A1 | 3/2022 |
| WO | 2019207160 A1 | 10/2019 |

OTHER PUBLICATIONS

Route Planning and Map Interference with Global Positioning Traces (Year: 2003).*

(Continued)

*Primary Examiner* — Anne Marie Antonucci
*Assistant Examiner* — Luis G Del Valle
(74) *Attorney, Agent, or Firm* — Vivacqua Crane, PLLC

(57) ABSTRACT

A method for merging lane line maps includes determining a road topology of a road segment. The method also includes identifying a plurality of fused points based at least in part on the road topology and based at least in part on a first lane line map of the road segment and a second lane line map of the road segment. The method also includes forming a fused lane line map based at least in part on the plurality of fused points. The method also includes performing a first action based at least in part on the fused lane line map.

11 Claims, 7 Drawing Sheets

(56) References Cited

U.S. PATENT DOCUMENTS

| | | |
|---|---|---|
| 2010/0191461 A1* | 7/2010 | Zeng .................. G01S 13/931 |
| | | 701/532 |
| 2014/0324339 A1 | 10/2014 | Adam et al. |
| 2016/0102986 A1 | 4/2016 | Ma et al. |
| 2018/0154901 A1 | 6/2018 | Hasberg et al. |
| 2019/0122386 A1 | 4/2019 | Wheeler et al. |
| 2019/0154842 A1 | 5/2019 | Adachi |
| 2019/0301873 A1 | 10/2019 | Prasser et al. |
| 2019/0302801 A1 | 10/2019 | Zlot et al. |
| 2020/0240794 A1 | 7/2020 | Prasser et al. |
| 2020/0249332 A1 | 8/2020 | Pandey et al. |
| 2020/0363218 A1 | 11/2020 | Kim |
| 2020/0393268 A1 | 12/2020 | Schroeter |
| 2020/0393567 A1 | 12/2020 | Schroeter |
| 2021/0140769 A1 | 5/2021 | Langland et al. |
| 2021/0158547 A1 | 5/2021 | He et al. |
| 2021/0213973 A1 | 7/2021 | Carillo Peña et al. |
| 2021/0343142 A1 | 11/2021 | Lewis et al. |
| 2022/0035376 A1* | 2/2022 | Laddah .................. G05D 1/247 |
| 2022/0113159 A1 | 4/2022 | Hou et al. |
| 2022/0126833 A1* | 4/2022 | Zhao .................. G05D 1/0274 |
| 2022/0215603 A1* | 7/2022 | Goldman ........ B60W 30/18009 |
| 2023/0060542 A1 | 3/2023 | Friedrich et al. |
| 2023/0125048 A1 | 4/2023 | Iguchi et al. |
| 2023/0209099 A1 | 6/2023 | Hur et al. |
| 2024/0412877 A1 | 12/2024 | Gee et al. |

OTHER PUBLICATIONS

Mining GPS Traces for Map Refinement (Year: 2003).*
Virtual Surveyor, Section Lines, Jun. 2023 (Year: 2023).*
Song, H., et al. "A Lightweight High Definition Mapping Method Based on Multi-Source Data Fusion Perception," Applied Sciences, 2023, vol. 13, pp. 1-17.

* cited by examiner

MERGING LANE LINE MAPS FOR A VEHICLE

The present disclosure relates to advanced driver assistance and automated driving systems and methods for vehicles.

To increase occupant awareness and convenience, vehicles may be equipped with advanced driver assistance systems (ADAS) and/or automated driving systems (ADS). ADAS systems may use various sensors such as cameras, radar, and LiDAR to detect and identify objects around the vehicle, including other vehicles, pedestrians, road configurations, traffic signs, and road markings. ADAS systems may take actions based on environmental conditions surrounding the vehicle, such as applying brakes or alerting an occupant of the vehicle. However, current ADAS systems may not account for additional factors which may affect occupant experience. ADS systems may use various sensors to detect objects in the environment around the vehicle and control the vehicle to navigate the vehicle through the environment to a predetermined destination. However, current ADAS and ADS systems may rely on accurate interpretation of road markings, such as, for example, lane markings, for optimal operation.

Thus, while ADAS and ADS systems and methods achieve their intended purpose, there is a need for a new and improved system and method for merging lane line maps for a vehicle.

SUMMARY

According to several aspects, a method for merging lane line maps is provided. The method includes determining a road topology of a road segment. The method also includes identifying a plurality of fused points based at least in part on the road topology and based at least in part on a first lane line map of the road segment and a second lane line map of the road segment. The method also includes forming a fused lane line map based at least in part on the plurality of fused points. The method also includes performing a first action based at least in part on the fused lane line map.

In another aspect of the present disclosure, determining the road topology of the road segment further may include retrieving topology data about the road segment. Determining the road topology of the road segment further may include determining a plurality of virtual lateral lines based at least in part on the topology data about the road segment. Each of the plurality of virtual lateral lines is perpendicular to the road segment. The plurality of virtual lateral lines are evenly spaced along a length of the road segment.

In another aspect of the present disclosure, Identifying the plurality of fused points further may include determining a plurality of corresponding point pairs. Each of the plurality of corresponding point pairs includes a first point and a second point. Each of the plurality of corresponding point pairs corresponds to one of the plurality of virtual lateral lines. Identifying the plurality of fused points further may include fusing each of the plurality of corresponding point pairs to form the plurality of fused points.

In another aspect of the present disclosure, determining the plurality of corresponding point pairs further may include selecting a first of the plurality of virtual lateral lines. Determining the plurality of corresponding point pairs further may include shifting a subset of a plurality of points of the first lane line map towards a plurality of points of the second lane line map based at least in part on the first of the plurality of virtual lateral lines. Determining the plurality of corresponding point pairs further may include identifying a first plurality of intersecting points. Each of the first plurality of intersecting points is one of the plurality of points of the first lane line map. Each of the first plurality of intersecting points intersects with the first of the plurality of virtual lateral lines. Determining the plurality of corresponding point pairs further may include identifying a second plurality of intersecting points. Each of the second plurality of intersecting points is one of the plurality of points of the second lane line map. Each of the second plurality of intersecting points intersects with the first of the plurality of virtual lateral lines. Determining the plurality of corresponding point pairs further may include determining one of the plurality of corresponding point pairs based at least in part on the first plurality of intersecting points and the second plurality of intersecting points. The first point of the one of the plurality of corresponding point pairs is from the first plurality of intersecting points and the second point of the one of the plurality of corresponding point pairs is from the second plurality of intersecting points. A distance between the first point and the second point is less than or equal to a predetermined corresponding point pair distance threshold. Determining the plurality of corresponding point pairs further may include repeating the selecting step, the shifting step, the identifying steps, and the determining step until each of the plurality of virtual lateral lines has been selected.

In another aspect of the present disclosure, shifting the subset of the plurality of points of the first lane line map further may include selecting the subset of the plurality of points of the first lane line map. Each of the subset of the plurality of points of the first lane line map is within a circle centered at one of the plurality of virtual lateral lines. Shifting the subset of the plurality of points of the first lane line map further may include shifting the subset of the plurality of points of the first lane line map towards the plurality of points of the second lane line map using an iterative closest point algorithm. The subset of the plurality of points of the first lane line map is only shifted along a lateral axis. The lateral axis is parallel to the one of the plurality of virtual lateral lines.

In another aspect of the present disclosure, determining the one of the plurality of corresponding point pairs further may include identifying the first point and the second point. A traffic direction of the first point corresponds with a traffic direction of the second point.

In another aspect of the present disclosure, identifying the first point and the second point further may include determining a traffic direction of each of the first plurality of intersecting points. The traffic direction of each of the first plurality of intersecting points includes one of a left traffic direction and a right traffic direction. Identifying the first point and the second point further may include determining a traffic direction of each of the second plurality of intersecting points. The traffic direction of each of the second plurality of intersecting points includes one of the left traffic direction and the right traffic direction. Identifying the first point and the second point further may include identifying the first point and the second point. The first point is one of the first plurality of intersecting points having the left traffic direction and the second point is one of the second plurality of intersecting points having the left traffic direction.

In another aspect of the present disclosure, fusing each of the plurality of corresponding point pairs further may include generating the plurality of fused points. Each of the plurality of fused points is located between the first point and the second point of one of the plurality of corresponding point pairs.

In another aspect of the present disclosure, forming the fused lane line map further may include plotting a lane line between each of the plurality of fused points. The lane line is substantially parallel to the road segment.

In another aspect of the present disclosure, performing the first action further may include adjusting an operation of a vehicle based at least in part on the fused lane line map.

According to several aspects, a system for merging lane line maps for a vehicle is provided. The system also includes a camera system, a vehicle communication system, and a vehicle controller in electrical communication with the camera system and the vehicle communication system. The vehicle controller is programmed to generate a first lane line map of a road segment in an environment surrounding the vehicle using the camera system. The vehicle controller is further programmed to receive a second lane line map of the road segment using the vehicle communication system. The vehicle controller is further programmed to identify a plurality of fused points based at least in part on the first lane line map and the second lane line map. The vehicle controller is further programmed to form a fused lane line map based at least in part on the plurality of fused points. The vehicle controller is further programmed to perform a first action based at least in part on the fused lane line map.

In another aspect of the present disclosure, to identify the plurality of fused points, the vehicle controller is further programmed to determine a plurality of virtual lateral lines. Each of the plurality of virtual lateral lines is perpendicular to the road segment. The plurality of virtual lateral lines are evenly spaced along a length of the road segment. To identify the plurality of fused points, the vehicle controller is further programmed to determine a plurality of corresponding point pairs. Each of the plurality of corresponding point pairs includes a first point and a second point. Each of the plurality of corresponding point pairs corresponds to one of the plurality of virtual lateral lines. To identify the plurality of fused points, the vehicle controller is further programmed to fuse each of the plurality of corresponding point pairs to form the plurality of fused points.

In another aspect of the present disclosure, to determine one of the plurality of corresponding point pairs, the vehicle controller is further programmed to select a first of the plurality of virtual lateral lines. To determine one of the plurality of corresponding point pairs, the vehicle controller is further programmed to shift a subset of a plurality of points of the first lane line map towards a plurality of points of the second lane line map based at least in part on the first of the plurality of virtual lateral lines. To determine one of the plurality of corresponding point pairs, the vehicle controller is further programmed to identify a first plurality of intersecting points. Each of the first plurality of intersecting points is one of the plurality of points of the first lane line map. Each of the first plurality of intersecting points intersects with the first of the plurality of virtual lateral lines. To determine one of the plurality of corresponding point pairs, the vehicle controller is further programmed to identify a second plurality of intersecting points. Each of the second plurality of intersecting points is one of the plurality of points of the second lane line map. Each of the second plurality of intersecting points intersects with the first of the plurality of virtual lateral lines. To determine one of the plurality of corresponding point pairs, the vehicle controller is further programmed to determine the one of the plurality of corresponding point pairs based at least in part on the first plurality of intersecting points and the second plurality of intersecting points. The first point of the one of the plurality of corresponding point pairs is from the first plurality of intersecting points and the second point of the one of the plurality of corresponding point pairs is from the second plurality of intersecting points. A distance between the first point and the second point is less than or equal to a predetermined corresponding point pair distance threshold.

In another aspect of the present disclosure, to shift the subset of the plurality of points of the first lane line map, the vehicle controller is further programmed to select the subset of the plurality of points of the first lane line map. Each of the subset of the plurality of points of the first lane line map is within a circle centered at one of the plurality of virtual lateral lines. To shift the subset of the plurality of points of the first lane line map, the vehicle controller is further programmed to shift the subset of the plurality of points of the first lane line map towards the plurality of points of the second lane line map using an iterative closest point algorithm. The subset of the plurality of points of the first lane line map is only shifted along a lateral axis. The lateral axis is parallel to the one of the plurality of virtual lateral lines.

In another aspect of the present disclosure, to determine the one of the plurality of corresponding point pairs, the vehicle controller is further programmed to determine a traffic direction of each of the first plurality of intersecting points. The traffic direction of each of the first plurality of intersecting points includes one of a left traffic direction and a right traffic direction. To determine the one of the plurality of corresponding point pairs, the vehicle controller is further programmed to determine a traffic direction of each of the second plurality of intersecting points. The traffic direction of each of the second plurality of intersecting points includes one of the left traffic direction and the right traffic direction. To determine the one of the plurality of corresponding point pairs, the vehicle controller is further programmed to identify the first point and the second point. The first point is one of the first plurality of intersecting points having the left traffic direction and the second point is one of the second plurality of intersecting points having the left traffic direction.

In another aspect of the present disclosure, to fuse each of the plurality of corresponding point pairs, the vehicle controller is further programmed to generate the plurality of fused points. Each of the plurality of fused points is located between the first point and the second point of one of the plurality of corresponding point pairs.

In another aspect of the present disclosure, performing the first action further may include adjusting an operation of the automated driving system based at least in part on the fused lane line map.

According to several aspects, a system for merging lane line maps for a vehicle is provided. The system includes a server system. The server system includes a server communication system and a server controller in electrical communication with the server communication system. The server controller is programmed to receive a first lane line map and a second lane line map of a road segment using the server communication system. The server controller is further programmed to identify a plurality of fused points based at least in part on the first lane line map and the second lane line map. The server controller is further programmed to form a fused lane line map based at least in part on the plurality of fused points. The server controller is further programmed to transmit the fused lane line map using the server communication system. The system also includes a vehicle system. The vehicle system includes a vehicle communication system, an automated driving system, and a vehicle controller in electrical communication with the vehicle communication system and the automated driving system. The vehicle controller is programmed to receive the fused lane line map from the server system using the vehicle communication system. The vehicle controller is further programmed to adjust an operation of the automated driving system based at least in part on the fused lane line map.

In another aspect of the present disclosure, to identify the plurality of fused points, the server controller is further programmed to determine a plurality of virtual lateral lines. Each of the plurality of virtual lateral lines is perpendicular to the road segment. The plurality of virtual lateral lines are evenly spaced along a length of the road segment. To identify the plurality of fused points, the server controller is further programmed to determine a plurality of corresponding point pairs. Each of the plurality of corresponding point pairs includes a first point and a second point. Each of the plurality of corresponding point pairs corresponds to one of the plurality of virtual lateral lines. To identify the plurality of fused points, the server controller is further programmed to generate a plurality of fused points. Each of the plurality of fused points is located between the first point and the second point of one of the plurality of corresponding point pairs.

In another aspect of the present disclosure, to determine one of the plurality of corresponding point pairs, the server controller is further programmed to select a first of the plurality of virtual lateral lines. To determine one of the plurality of corresponding point pairs, the server controller is further programmed to shift a subset of a plurality of points of the first lane line map towards a plurality of points of the second lane line map based at least in part on the first of the plurality of virtual lateral lines. To determine one of the plurality of corresponding point pairs, the server controller is further programmed to identify a first plurality of intersecting points. Each of the first plurality of intersecting points is one of the plurality of points of the first lane line map. Each of the first plurality of intersecting points intersects with the first of the plurality of virtual lateral lines. To determine one of the plurality of corresponding point pairs, the server controller is further programmed to identify a second plurality of intersecting points. Each of the second plurality of intersecting points is one of the plurality of points of the second lane line map. Each of the second plurality of intersecting points intersects with the first of the plurality of virtual lateral lines. To determine one of the plurality of corresponding point pairs, the server controller is further programmed to determine the one of the plurality of corresponding point pairs based at least in part on the first plurality of intersecting points and the second plurality of intersecting points. The first point of the one of the plurality of corresponding point pairs is from the first plurality of intersecting points and the second point of the one of the plurality of corresponding point pairs is from the second plurality of intersecting points. A distance between the first point and the second point is less than or equal to a predetermined corresponding point pair distance threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Crowd-sourcing methods may be used to gather data about lane lines on roadways, such as, for example, lane line maps. However, due to variation in measuring equipment, environmental conditions, location accuracy, and/or the like, lane line maps from different sources (e.g., perception measurements performed by vehicles, aerial imagery of roadways, vehicle telemetry data, and/or the like) of the same location (i.e., road segment) may differ. Thus, the present disclosure provides a new and improved system and method for merging lane line maps acquired from different sources and/or at different points in time, resulting in increased performance and/or accuracy of vehicle systems which utilize lane line maps, such as, for example automated driving systems.

Figure 1:
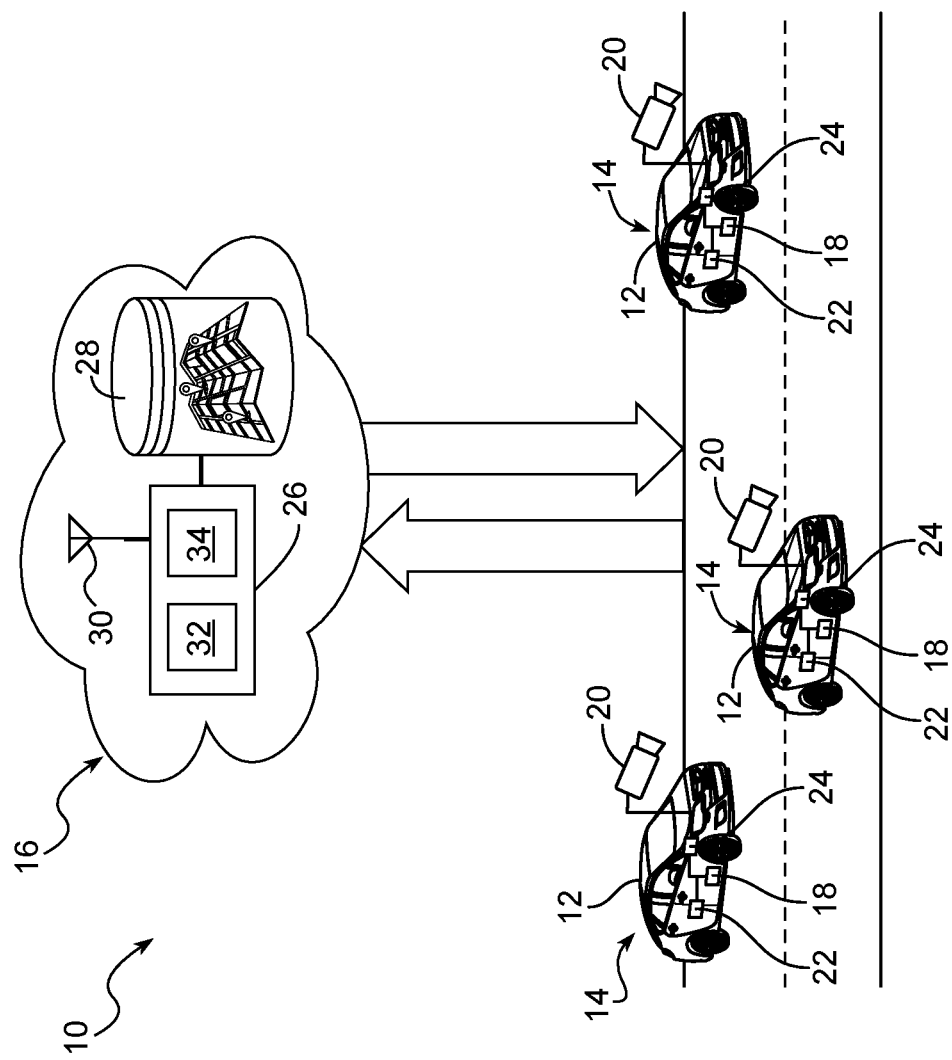
FIG. 1 is a schematic diagram of a system for merging lane line maps for a vehicle, according to an exemplary embodiment.

Referring to FIG. 1, a schematic diagram of a system 10 for merging lane line maps is shown. The system 10 includes one or more vehicles 12, each of the one or more vehicles 12 including a vehicle system 14. The system 10 further includes a server system 16.

The vehicle system 14 includes a vehicle controller 18, a camera system 20, an automated driving system 22, and a vehicle communication system 24.

The vehicle controller 18 is used to implement a method 100 for merging lane line maps, as will be described below. The vehicle controller 18 includes at least one processor and a non-transitory computer readable storage device or media. The processor may be a custom made or commercially available processor, a central processing unit (CPU), a graphics processing unit (GPU), an auxiliary processor among several processors associated with the vehicle controller 18, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 18 to control various systems of the vehicle 12. The vehicle controller 18 may also consist of multiple controllers which are in electrical communication with each other. The vehicle controller 18 may be interconnected with additional systems and/or controllers of the vehicle 12, allowing the vehicle controller 18 to access data such as, for example, speed, acceleration, braking, and steering angle of the vehicle 12.

The vehicle controller 18 is in electrical communication with the camera system 20, automated driving system 22, and the vehicle communication system 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 18 are within the scope of the present disclosure.

The camera system 20 is used to capture images and/or videos of the environment surrounding the vehicle 12. In an exemplary embodiment, the camera system 20 includes a photo and/or video camera which is positioned to view the environment surrounding the vehicle 12. In a non-limiting example, the camera system 20 includes cameras affixed inside of the vehicle 12, for example, in a headliner of the vehicle 12, having a view through the windscreen. In another non-limiting example, the camera system 20 includes cameras affixed outside of the vehicle 12, for example, on a roof of the vehicle 12, having a view of the environment in front of the vehicle 12.

In another exemplary embodiment, the camera system 20 is a surround view camera system including a plurality of cameras (also known as satellite cameras) arranged to provide a view of the environment adjacent to all sides of the vehicle 12. In a non-limiting example, the camera system 20 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 20 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The automated driving system 22 is used to provide assistance to an occupant to increase occupant awareness and/or control behavior of the vehicle 12. In the scope of the present disclosure, the automated driving system 22 encompasses systems which provide any level of assistance to the occupant (e.g., blind spot warning, lane departure warning, and/or the like) and systems which are capable of autonomously driving the vehicle 12 under some or all conditions. It should be understood that all levels of driving automation defined by, for example, SAE J3016 (i.e., SAE LEVEL 0, SAE LEVEL 1, SAE LEVEL 2, SAE LEVEL 3, SAE LEVEL 4, and SAE LEVEL 5) are within the scope of the present disclosure.

In an exemplary embodiment, the automated driving system 22 is configured to detect and/or receive information about the environment surrounding the vehicle 12 and process the information to provide assistance to the occupant. In some embodiments, the automated driving system 22 is a software module executed on the vehicle controller 18. In other embodiments, the automated driving system 22 includes a separate automated driving system controller, similar to the vehicle controller 18, capable of processing the information about the environment surrounding the vehicle 12. In an exemplary embodiment, the automated driving system 22 may operate in a manual operation mode, a partially automated operation mode, and/or a fully automated operation mode.

In the scope of the present disclosure, the manual operation mode means that the automated driving system 22 provides warnings or notifications to the occupant but does not intervene or control the vehicle 12 directly. In a non-limiting example, the automated driving system 22 receives information from a plurality of vehicle sensors (e.g., the camera system 20). Using techniques such as, for example, computer vision, the automated driving system 22 understands the environment surrounding the vehicle 12 and provides assistance to the occupant. For example, if the automated driving system 22 identifies, based on data from the plurality of vehicle sensors, that the vehicle 12 is likely to collide with a remote vehicle, the automated driving system 22 may provide a warning to the occupant.

In the scope of the present disclosure, the partially automated operation mode means that the automated driving system 22 provides warnings or notifications to the occupant and may intervene or control the vehicle 12 directly in certain situations. In a non-limiting example, the automated driving system 22 is additionally in electrical communication with components of the vehicle 12 such as a brake system, a propulsion system, and/or a steering system of the vehicle 12, such that the automated driving system 22 may control the behavior of the vehicle 12. In a non-limiting example, the automated driving system 22 may control the behavior of the vehicle 12 by applying brakes of the vehicle 12 to avoid an imminent collision. In another non-limiting example, the automated driving system 22 may control the brake system, propulsion system, and steering system of the vehicle 12 to temporarily drive the vehicle 12 towards a predetermined destination. However, intervention by the occupant may be required at any time. In an exemplary embodiment, the automated driving system 22 may include additional components such as, for example, an eye tracking device configured to monitor an attention level of the occupant and ensure that the occupant is prepared to take over control of the vehicle 12.

In the scope of the present disclosure, the fully automated operation mode means that the automated driving system 22 uses data from the plurality of vehicle sensors to understand the environment and control the vehicle 12 to drive the vehicle 12 to a predetermined destination without a need for control or intervention by the occupant.

The automated driving system 22 operates using a path planning algorithm which is configured to generate a safe and efficient trajectory for the vehicle 12 to navigate in the environment surrounding the vehicle 12. In an exemplary embodiment, the path planning algorithm is a machine learning algorithm trained to output control signals for the vehicle 12 based on input data collected from the plurality of vehicle sensors. In another exemplary embodiment, the path planning algorithm is a deterministic algorithm which has been programmed to output control signals for the vehicle 12 based on data collected from the plurality of vehicle sensors.

In a non-limiting example, the path planning algorithm performs perception and mapping tasks to interpret data collected from the plurality of vehicle sensors and create a detailed map of the environment. The detailed map may include information about lane lines, road geometry, speed limits, traffic signs, and/or other relevant features. Based on the detailed map and a current state of the vehicle 12 (i.e., position, velocity, and orientation of the vehicle 12, the path planning algorithm generates a sequence of waypoints or a continuous path that the vehicle 12 should follow to reach a destination while adhering to rules, regulations, and safety constraints. It should be understood that the automated driving system 22 may include any software and/or hardware module configured to operate in the manual operation mode, the partially automated operation mode, or the fully automated operation mode as described above.

The vehicle communication system 24 is used by the vehicle controller 18 to communicate with other systems external to the vehicle 12. For example, the vehicle communication system 24 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 24 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 24 may further include an embedded universal integrated circuit card (eUICC) configured to store at least one cellular connectivity configuration profile, for example, an embedded subscriber identity module (eSIM) profile. The vehicle communication system 24 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 24 may include one or more antennas and/or communication transceivers for receiving and/or transmitting signals, such as cooperative sensing messages (CSMs). The vehicle communication system 24 is configured to wirelessly communicate information between the vehicle 12 and another vehicle. Further, the vehicle communication system 24 is configured to wirelessly communicate information between the vehicle 12 and infrastructure or other vehicles. It should be understood that the vehicle communication system 24 may be integrated with the vehicle controller 18 (e.g., on a same circuit board with the vehicle controller 18 or otherwise a part of the vehicle controller 18) without departing from the scope of the present disclosure.

With continued reference to FIG. 1, the server system 16 includes a server controller 26 in electrical communication with a map database 28 and a server communication system 30. In a non-limiting example, the server system 16 is located in a server farm, datacenter, or the like, and connected to the internet using the server communication system 30. The server controller 26 includes at least one server processor 32 and a server non-transitory computer readable storage device or server media 34. The description of the type and configuration given above for the vehicle controller 18 also applies to the server controller 26. In some examples, the server controller 26 may differ from the vehicle controller 18 in that the server controller 26 is capable of a higher processing speed, includes more memory, includes more inputs/outputs, and/or the like. In a non-limiting example, the server processor 32 and server media 34 of the server controller 26 are similar in structure and/or function to the processor and the media of the vehicle controller 18, as described above. The map database 28 is used to store map data about roadways, including, for example, lane line map data, as will be discussed in greater detail below. The server communication system 30 is used to communicate with external systems, such as, for example, the vehicle controller 18 via the vehicle communication system 24. In a non-limiting example, server communication system 30 is similar in structure and/or function to the vehicle communication system 24 of the vehicle system 14, as described above. In some examples, the server communication system 30 may differ from the vehicle communication system 24 in that the server communication system 30 is capable of higher power signal transmission, more sensitive signal reception, higher bandwidth transmission, additional transmission/reception protocols, and/or the like.

Figure 2:
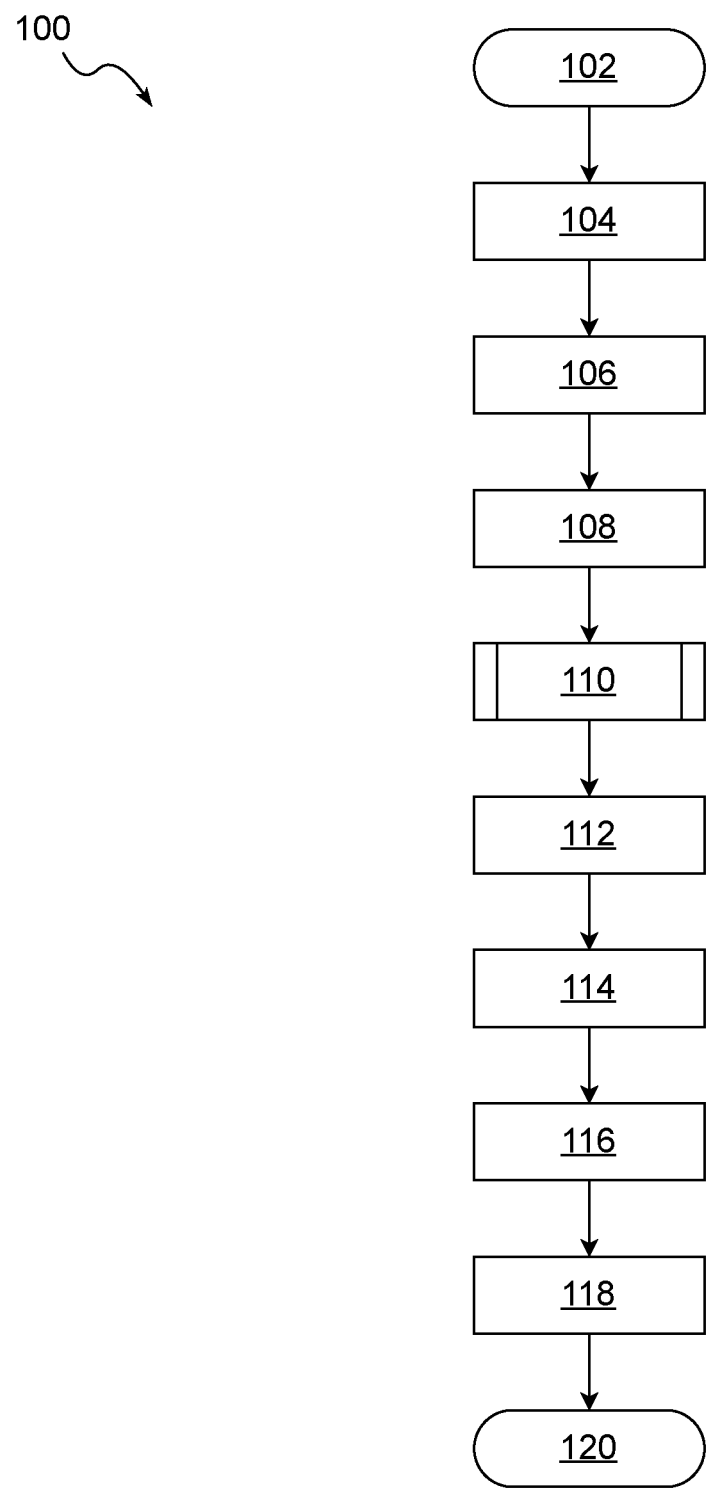
FIG. 2 is a flowchart of a method for merging lane line maps for a vehicle, according to an exemplary embodiment.
Figure 3:
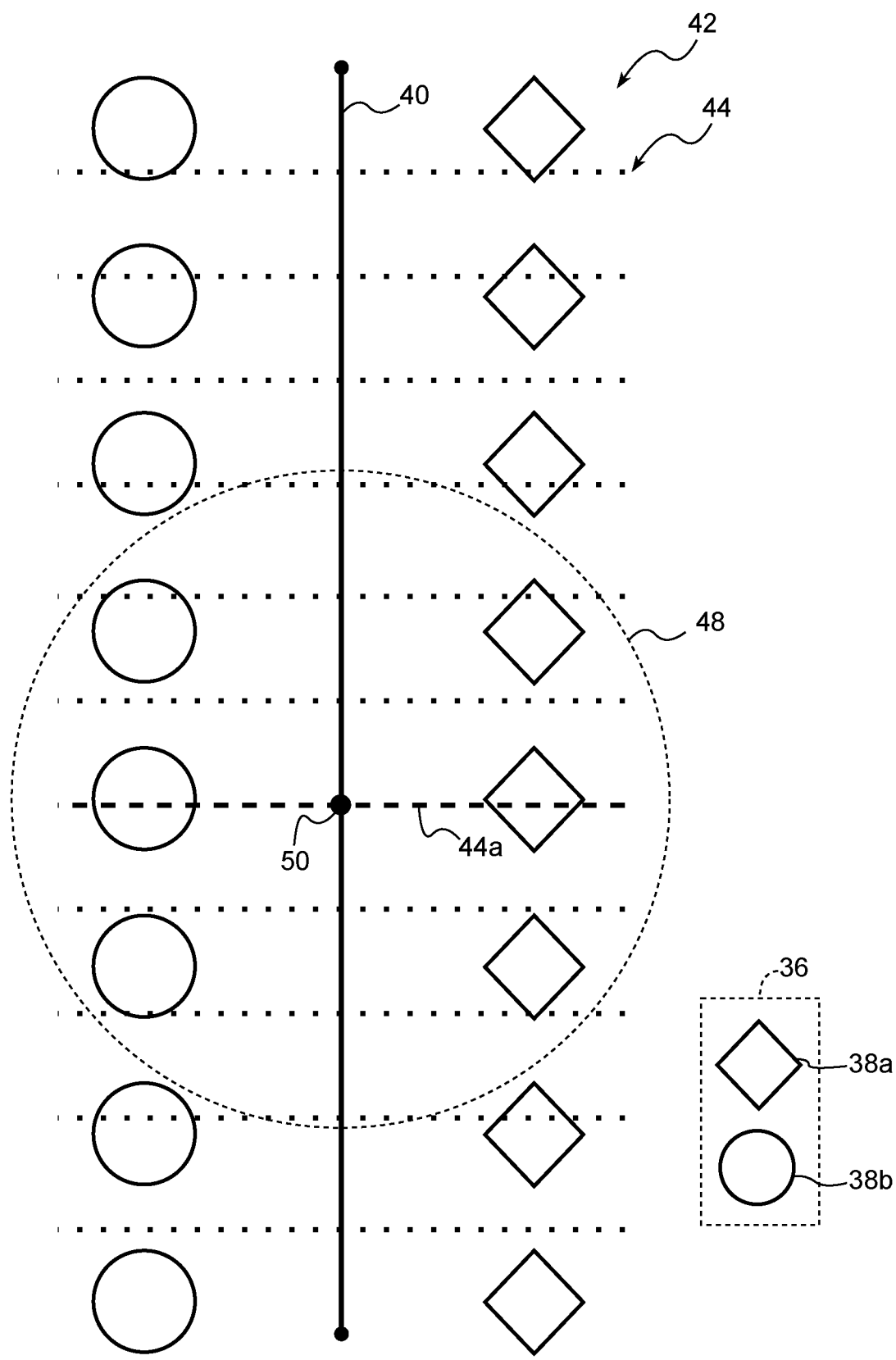
FIG. 3 is a diagram of a plurality of lane line maps, according to an exemplary embodiment.

Referring to FIG. 2, a flowchart of the method 100 for merging lane line maps for a vehicle is shown. It should be understood that the method 100 may be executed by the vehicle system 14, the server system 16, or the entire system 10 (i.e., the vehicle system 14 and the server system 16 working together). Throughout the present disclosure, references to method steps performed being performed by the system 10 should be understood to mean any combination of the vehicle system 14 and the server system 16. The method 100 begins at block 102 and proceeds to block 104. Referring to FIG. 3, a diagram of a plurality of lane line maps is shown. FIG. 3 includes a key 36 which indicates the meaning of symbols in FIG. 3.

With reference to FIG. 3 and with continued reference to FIG. 2, at block 104, the system 10 receives a first lane line map 38a and a second lane line map 38b of a particular road segment 40. In a non-limiting example, the first lane line map 38a and the second lane line map 38b are crowd-sourced from the one or more vehicles 12. In another non-limiting example, the first lane line map 38a and/or the second lane line map 38b are provided from another source, such as, for example, arial imagery, vehicle telemetry data, road survey data, and/or the like. It should be understood that the system 10 and method 100 of the present disclosure are applicable to lane line maps obtained from any two or more sources, including, but not limited to, lane line maps crowd-sourced from the one or more vehicles 12. In the scope of the present disclosure, a lane line map is used to describe a location, type, and color of lane markings on a roadway. The first and second lane line maps 38a, 38b include a plurality of points 42. Each of the plurality of points 42 describes a lane line (i.e., a road marking). Each of the plurality of points 42 includes a plurality of point characteristics. In a non-limiting example, the plurality of point characteristics includes at least a geographical location of the point, a color of a lane line described by the point (e.g., yellow or white), a type of the lane line described by the point (e.g., solid, dashed, and/or double), a vehicle heading when observing the lane line described by the point, and a traffic direction of the point. In the scope of the present disclosure, the traffic direction is a location of the point relative to a vehicle observing the point. The traffic direction may be left traffic direction or a right traffic direction. For example, a point describing a center lane line has a left traffic direction, because it is observed on a left side of vehicles travelling in both directions. For edge lane lines, the traffic direction of the point depends on the vehicle heading when observing the lane line. It should be understood that the lane line map may include additional elements, such as, for example, additional painted markings, road edges (i.e., boundaries between paved surfaces and unpaved surfaces), virtual lane lines (i.e., computer-inferred lane lines where painted lane lines are not present, for example, within an intersection), and/or additional objects, markings, and characteristics of roadways without departing from the scope of the present disclosure. Additionally, it should be understood that the system 10 and method 100 disclosed herein are applicable to the additional elements of lane line maps disclosed above in addition to lane markings.

It should be understood that while two lane line maps are discussed for the purpose of explanation, any number of lane line maps may be merged using the system 10 and method 100 within the scope of the present disclosure. Furthermore, for the sake of explanation, the first lane line map 38a and the second lane line map 38b illustrated herein contain a plurality of points 42 describing a single lane line (e.g., a center lane line or an edge lane line). However, it should be understood that while the following explanation will focus on the example of the single lane line, the system 10 and method 100 disclosed herein are equally applicable to lane line maps including points describing multiple lane lines (e.g., a center lane line, a left edge lane line, a right edge lane line, a shoulder lane line, a road edge lane line, and/or the like).

As shown in FIG. 3, the first lane line map 38a and the second lane line map 38b may differ. This may be caused by many factors, such as, for example, global navigation satellite system (GNSS) accuracy variation, sensor accuracy variation, variations in environmental conditions during data gathering for the first lane line map 38a and/or the second lane line map 38b, occlusion of lane lines during data gathering for the first lane line map 38a and/or the second lane line map 38b, and/or the like.

In an exemplary embodiment, the server system 16 receives the first lane line map 38a and the second lane line map 38b from one or more vehicles 12 using the server communication system 30. In a non-limiting example, the first lane line map 38a and/or the second lane line map 38b are stored in the map database 28 of the server system 16. In another exemplary embodiment, the vehicle system 14 uses the camera system 20 to perform a plurality of measurements of the environment surrounding the vehicle 12 and calculate the first lane line map 38a. The second lane line map 38b is sent by the server system 16 or another remote vehicle and received by the vehicle system 14 using the vehicle communication system 24. It should be understood that, as discussed above, execution of the method 100 may occur on the vehicle system 14 using the vehicle controller 18 and/or on the server system 16 using the server controller 26 without departing from the scope of the present disclosure. After block 104, the method 100 proceeds to block 106.

At block 106, the system 10 determines a road topology of the road segment 40. In the scope of the present disclosure, the road topology includes information such as, for example, a geographical location of the road segment 40, an elevation of the road segment 40, a heading of a direction of travel on the road segment 40, a number of lanes on the road segment 40, a surface type (e.g., paved or unimproved) of the road segment 40, and/or the like. In an exemplary embodiment, the road topology is determined by receiving topology data using the server communication system 30 and/or the vehicle communication system 24. In another exemplary embodiment, the topology data is stored in the map database 28 and retrieved by the server controller 26. After block 106, the method 100 proceeds to block 108.

Referring again to FIG. 3 and with continued reference to FIG. 2, at block 108, the system 10 determines a plurality of virtual lateral lines 44. Each of the plurality of virtual lateral lines 44 is perpendicular to the road segment 40. In an exemplary embodiment, the plurality of virtual lateral lines 44 are evenly spaced (e.g., at one-meter intervals) along the road segment 40. The term "virtual" is used because the plurality of virtual lateral lines 44 are not physical objects on the road segment 40. Instead, the plurality of virtual lateral lines 44 are used by the system 10 and the method 100 to represent a perpendicular direction relative to the road segment 40, as will be discussed in greater detail below. In an exemplary embodiment, the plurality of virtual lateral lines 44 is determined based at least in part on the road topology determined at block 106. In a non-limiting example, the plurality of virtual lateral lines 44 are determined to be perpendicular to the heading of a direction of travel on the road segment 40 determined at block 106. After block 108, the method 100 proceeds to block 110.

Figure 4:
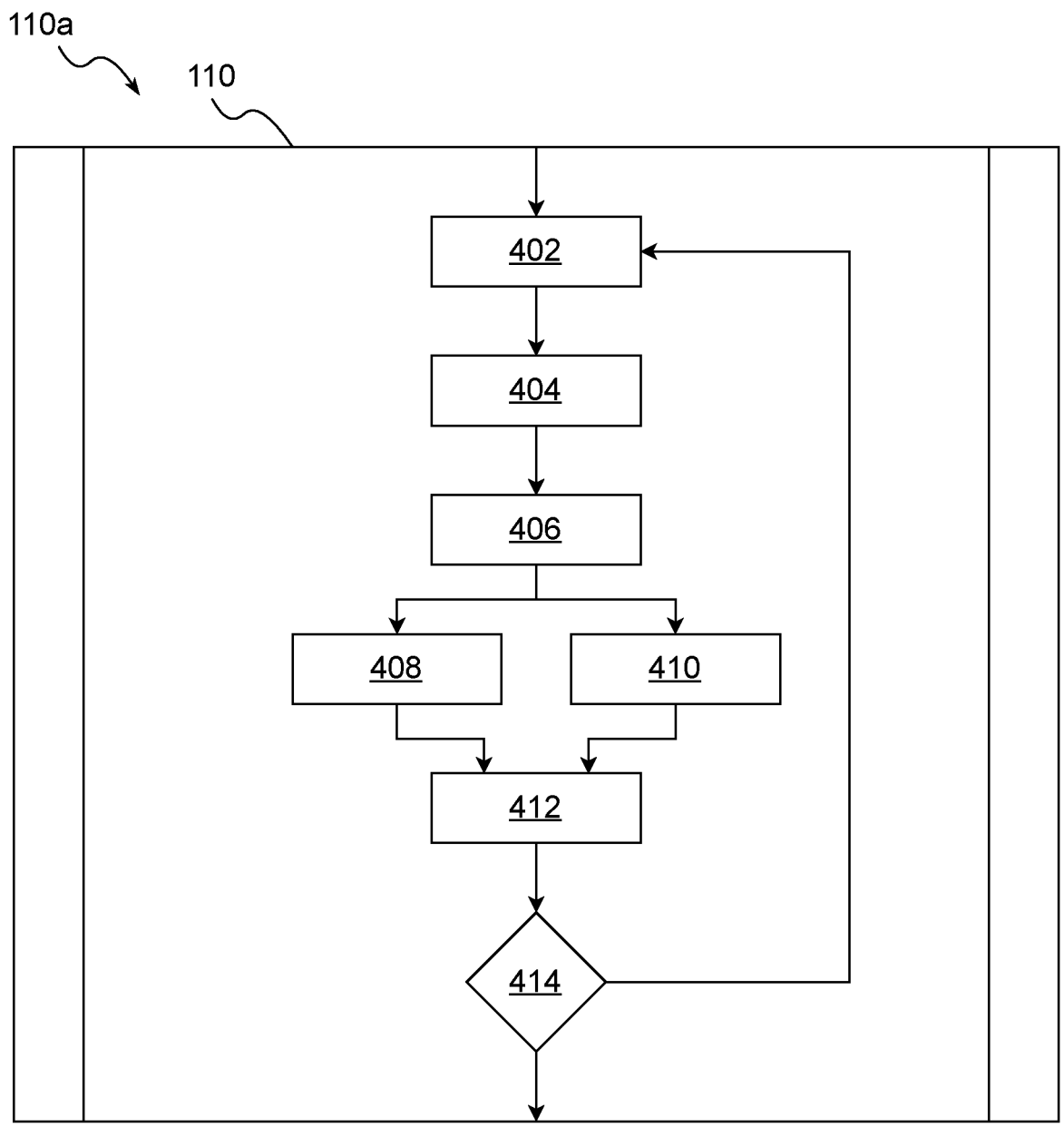
FIG. 4 is a flowchart of a method for determining a plurality of corresponding point pairs, according to an exemplary embodiment.
Figure 5:
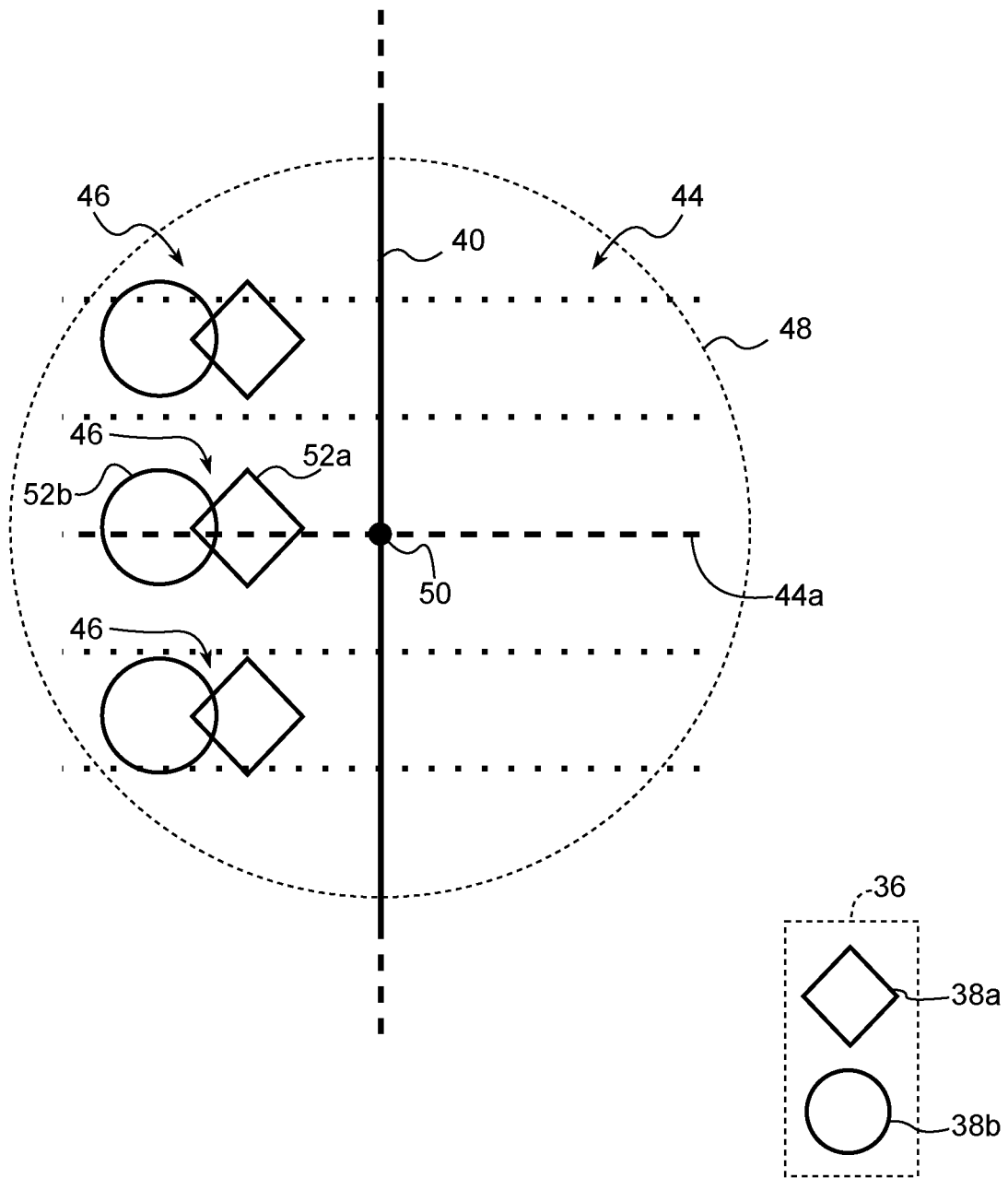
FIG. 5 is a diagram of a road segment showing the plurality of corresponding point pairs, according to an exemplary embodiment.

At block 110, the system 10 determines a plurality of corresponding point pairs 46. Referring to FIG. 4, a flowchart of an exemplary embodiment 110a of block 110 is shown. Referring to FIG. 5, a diagram of the road segment 40 showing the plurality of corresponding point pairs 46 is shown. FIG. 5 includes a key 36 which indicates the meaning of symbols in FIG. 5. With reference to FIGS. 3, 4, and 5, the exemplary embodiment 110a of block 110 begins at block 402. At block 402, the system 10 selects one of the plurality of virtual lateral lines 44, hereinafter referred to as a first virtual lateral line 44a. After block 402, the exemplary embodiment 110a proceeds to block 404. At block 404, the system 10 selects a subset of the plurality of points 42 of the first lane line map 38a. In an exemplary embodiment, each of the subset of the plurality of points 42 of the first lane line map 38a is within a circle 48 centered around an intersection point 50 of the first virtual lateral line 44a and the road segment 40. In a non-limiting example, the circle 48 has a predetermined radius (e.g., three meters). After block 404, the exemplary embodiment 110a proceeds to block 406.

At block 406, the system 10 shifts the subset of the plurality of points 42 of the first lane line map 38a selected at block 404 towards the plurality of points 42 of the second lane line map 38b. In an exemplary embodiment, the subset of the plurality of points 42 of the first lane line map 38a are shifted using an iterative closest point (ICP) algorithm. The primary objective of the ICP algorithm is to align two or more pluralities of points by iteratively minimizing a difference between corresponding points. The ICP algorithm operates by establishing correspondences between points in a source plurality of points (i.e., the plurality of points 42 of the second lane line map 38b) and a target plurality of points (i.e., the subset of the plurality of points 42 of the first lane line map 38a), based on proximity measures such as Euclidean distance. The correspondences are then utilized to estimate a transformation matrix that best aligns the source and target pluralities of points. In a non-limiting example, the ICP algorithm is configured such that the transformation matrix only allows shifts of the target plurality of points (i.e., the subset of the plurality of points 42 of the first lane line map 38a) along a lateral axis. The lateral axis is an axis parallel to the first virtual lateral line 44a. The ICP algorithm iteratively refines the transformation by minimizing the overall distance between corresponding points. The iterative process continues until convergence is achieved, signifying an optimal alignment between the source and target pluralities of points. It should be understood that other methods and algorithms for aligning pluralities of points may be used without departing from the scope of the present disclosure. FIG. 5 shows the corresponding point pairs 46 after shifting at block 406. After block 406, the exemplary embodiment 110a proceeds to blocks 408 and 410.

At block 408, the system 10 identifies a first plurality of intersecting points 52a. Each of the first plurality of intersecting points 52a is one of the plurality of points 42 of the first lane line map 38a. Each of the first plurality of intersecting points 52a intersects with the first virtual lateral line 44a, as shown in FIG. 5. In the exemplary embodiment shown in FIG. 5, the first plurality of intersecting points 52a contains only one point. However, it should be understood that the first plurality of intersecting points 52a may contain one or more points. For example, if the first lane line map 38a includes multiple lane lines, the first plurality of intersecting points 52a may contain at least one point for each of the multiple lane lines. After block 408, the exemplary embodiment 110a proceeds to block 412, as will be discussed in greater detail below.

At block 410, the system 10 identifies a second plurality of intersecting points 52b. Each of the second plurality of intersecting points 52b is one of the plurality of points 42 of the second lane line map 38b. Each of the second plurality of intersecting points 52b intersects with the first virtual lateral line 44a, as shown in FIG. 5. In the exemplary embodiment shown in FIG. 5, the second plurality of intersecting points 52b contains only one point. However, it should be understood that the second plurality of intersecting points 52b may contain one or more points. For example, if the second lane line map 38b includes multiple lane lines, the second plurality of intersecting points 52b may contain at least one point for each of the multiple lane lines. After block 410, the exemplary embodiment 110a proceeds to block 412.

At block 412, the system 10 determines one of the plurality of corresponding point pairs 46. In an exemplary embodiment, the one of the plurality of corresponding point pairs 46 includes a first point and a second point. The first point of the one of the plurality of corresponding point pairs 46 is one of the first plurality of intersecting points 52a. The second point of the one of the plurality of corresponding point pairs 46 is one of the second plurality of intersecting points 52b. In an exemplary embodiment, a distance between the first point of the one of the plurality of corresponding point pairs 46 and the second point of the one of the plurality of corresponding point pairs 46 is less than or equal to a predetermined corresponding point pair distance threshold (e.g., thirty centimeters). In another exemplary embodiment, the traffic direction of the first point of the one of the plurality of corresponding point pairs 46 corresponds with the traffic direction of the second point of the one of the plurality of corresponding point pairs 46. As discussed above, the traffic direction is one of the plurality of point characteristics. In a non-limiting example, the system 10 determines the traffic direction of each of the first plurality of intersecting points 52a and the traffic direction of each of the second plurality of intersecting points 52b. The one of the plurality of corresponding point pairs 46 includes a first point from the first plurality of intersecting points 52a having the left traffic direction and a second point from the second plurality of intersecting points 52b also having the left traffic direction. After block 412, the exemplary embodiment 110a proceeds to block 414.

At block 414, if each of the plurality of virtual lateral lines 44 has not yet been selected at block 402, the exemplary embodiment 110a returns to block 402. If each of the plurality of virtual lateral lines 44 has been selected at block 402, the exemplary embodiment 110a is concluded, and the method 100 proceeds to block 112.

Figure 6:
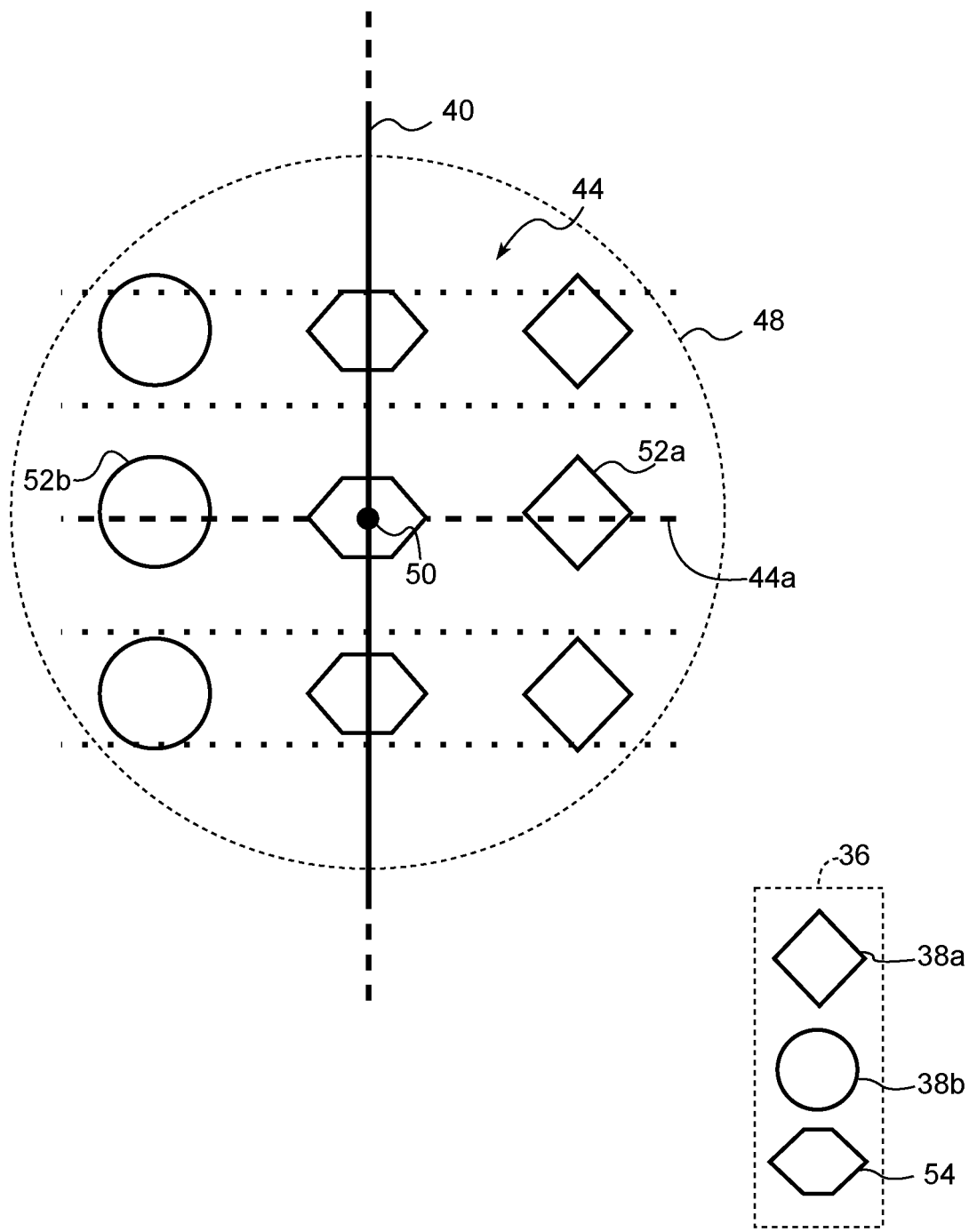
FIG. 6 is a diagram of the road segment showing a plurality of fused points, according to an exemplary embodiment.

Referring to FIG. 6, a diagram of the road segment 40 showing a plurality of fused points 54 is shown. FIG. 6 includes a key 36 which indicates the meaning of symbols in FIG. 6. Referring to FIGS. 2 and 6, at block 112, the system 10 fuses each of the plurality of corresponding point pairs 46 to generate the plurality of fused points 54. To fuse each of the plurality of corresponding point pairs 46, the original first lane line map 38a and second lane line map 38b are used (i.e., before the shifting step during the exemplary embodiment 110a at block 406), as shown in FIG. 6. In an exemplary embodiment, each of the plurality of fused points 54 is located between the first point and the second point of each of the plurality of corresponding point pairs 46. In a non-limiting example, the plurality of fused points 54 are located at a midpoint between the first point and the second point of each of the plurality of corresponding point pairs 46, as shown in FIG. 6. In another non-limiting example, the plurality of fused points 54 are located based on a confidence level of the first lane line map 38a and the second lane line map 38b. For example, if the first lane line map 38a has a higher confidence level, the plurality of fused points 54 are located closer to the first lane line map 38a. After block 112, the method 100 proceeds to block 114.

Figure 7:
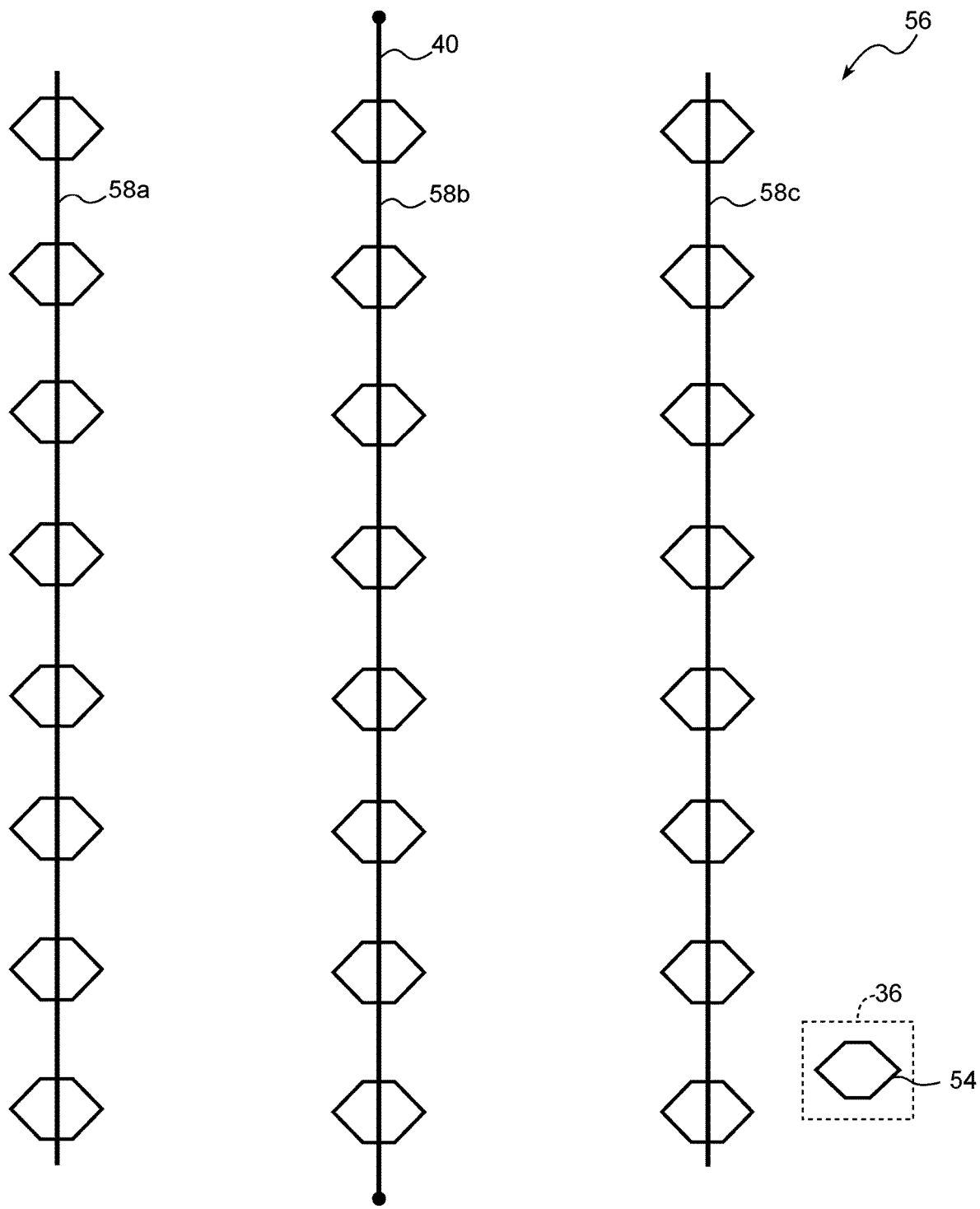
FIG. 7 is a diagram of a fused lane line map, according to an exemplary embodiment.

Referring to FIG. 7, a diagram of a fused lane line map 56 is shown. FIG. 7 includes a key 36 which indicates the meaning of symbols in FIG. 7. Referring to FIGS. 2 and 7, at block 114, the system 10 forms the fused lane line map 56. In an exemplary embodiment, to form the fused lane line map 56, the system 10 plots a lane line 58a, 58b, 58c between each of the plurality of fused points 54. The lane lines 58a, 58b, 58c are substantially parallel to the road segment 40. In the scope of the present disclosure, substantially parallel to the road segment 40 means that the lane lines 58a, 58b, 58c are oriented along a direction of travel of the road segment 40. In other words, the lane lines 58a, 58b, 58c are substantially perpendicular to the plurality of virtual lateral lines 44 determined at block 108. FIG. 7 illustrates an example with multiple lane lines 58a, 58b, 58c. In a non-limiting example, a first lane line 58a is a left edge lane line, a second lane line 58b is a center lane line, and a third lane line 58c is a right edge lane line. After block 114, the method 100 proceeds to block 116.

At block 116, the fused lane line map 56 formed at block 114 is transmitted to the one or more vehicles 12. In an exemplary embodiment wherein the fused lane line map 56 is formed using the server system 16, the server controller 26 uses the server communication system 30 to transmit the fused lane line map 56 to the one or more vehicles 12. In an exemplary embodiment wherein the fused lane line map 56 is formed using the vehicle system 14, the vehicle controller 18 uses the vehicle communication system 24 to transmit the fused lane line map 56 to the one or more vehicles 12 and/or the server system 16. After block 116, the method 100 proceeds to block 118.

At block 118, the vehicle system 14 receives the fused lane line map 56 transmitted at block 116 and adjusts an operation of the automated driving system 22 based at least in part on the fused lane line map 56. In an exemplary embodiment, the path planning algorithm of the automated driving system 22 uses the fused lane line map 56 to generate the trajectory or the vehicle 12. In another exemplary embodiment, the automated driving system 22 uses the fused lane line map 56 to increase an accuracy of a lane departure warning feature and/or a lane keeping feature of the automated driving system 22. After block 118, the method 100 proceeds to enter a standby state at block 120.

In an exemplary embodiment, the system 10 repeatedly exits the standby state 120 and restarts the method 100 at block 102. In a non-limiting example, the system 10 exits the standby state 120 and restarts the method 100 on a timer, for example, every three hundred milliseconds.

The system 10 and method 100 of the present disclosure offer several advantages. Firstly, using the ICP algorithm discussed above in reference to block 406, points are only shifted along a lateral axis parallel to the plurality of virtual lateral lines. This prevents the introduction of point registration errors in a longitudinal direction. Furthermore, by iteratively moving along the road segment to fuse points at each of the plurality of virtual lateral lines, the resulting fused lane line map is smooth between consecutive road segments. Use of the system 10 with the method 100 allows for differing data about lane lines on roadways to fused into a single fused lane line map. The fused lane line map is then used by vehicle systems, such as, for example, automated driving systems, to improve performance and/or accuracy of automated driving and/or driver assistance features.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for merging lane line maps, the method comprising:
   determining a road topology of a road segment, wherein determining the road topology of the road segment further comprises:
   retrieving topology data about the road segment; and
   determining a plurality of virtual lateral lines based at least in part on the topology data about the road segment, wherein each of the plurality of virtual lateral lines is perpendicular to the road segment, and wherein the plurality of virtual lateral lines are evenly spaced along a length of the road segment;
   identifying a plurality of fused points based at least in part on the road topology and based at least in part on a first lane line map of the road segment and a second lane line map of the road segment, wherein identifying the plurality of fused points further comprises:
   determining a plurality of corresponding point pairs, wherein each of the plurality of corresponding point pairs includes a first point and a second point, and wherein each of the plurality of corresponding point pairs corresponds to one of the plurality of virtual lateral lines; and
   fusing each of the plurality of corresponding point pairs to form the plurality of fused points, wherein each of the plurality of fused points is located between the first point and the second point of one of the plurality of corresponding point pairs;
   forming a fused lane line map based at least in part on the plurality of fused points; and
   controlling a path of a vehicle using an automated driving system based at least in part on the fused lane line map.

2. The method of claim 1, wherein determining the plurality of corresponding point pairs further comprises:
   selecting a first of the plurality of virtual lateral lines;
   shifting a subset of a plurality of points of the first lane line map towards a plurality of points of the second lane line map based at least in part on the first of the plurality of virtual lateral lines;
   identifying a first plurality of intersecting points, wherein each of the first plurality of intersecting points is one of the plurality of points of the first lane line map, and wherein each of the first plurality of intersecting points intersects with the first of the plurality of virtual lateral lines;
   identifying a second plurality of intersecting points, wherein each of the second plurality of intersecting points is one of the plurality of points of the second lane line map, and wherein each of the second plurality of intersecting points intersects with the first of the plurality of virtual lateral lines;
   determining one of the plurality of corresponding point pairs based at least in part on the first plurality of intersecting points and the second plurality of intersecting points, wherein the first point of the one of the plurality of corresponding point pairs is from the first plurality of intersecting points and the second point of the one of the plurality of corresponding point pairs is from the second plurality of intersecting points, and wherein a distance between the first point and the second point is less than or equal to a predetermined corresponding point pair distance threshold; and
   repeating the selecting step, the shifting step, the identifying steps, and the determining step until each of the plurality of virtual lateral lines has been selected.

3. The method of claim 2, shifting the subset of the plurality of points of the first lane line map further comprises:
   selecting the subset of the plurality of points of the first lane line map, wherein each of the subset of the plurality of points of the first lane line map is within a circle centered at one of the plurality of virtual lateral lines; and
   shifting the subset of the plurality of points of the first lane line map towards the plurality of points of the second lane line map using an iterative closest point algorithm, wherein the subset of the plurality of points of the first lane line map is only shifted along a lateral axis, and wherein the lateral axis is parallel to the one of the plurality of virtual lateral lines.

4. The method of claim 2, wherein determining the one of the plurality of corresponding point pairs further comprises:

identifying the first point and the second point, wherein a traffic direction of the first point corresponds with a traffic direction of the second point.

5. The method of claim 4, wherein identifying the first point and the second point further comprises:
determining a traffic direction of each of the first plurality of intersecting points, wherein the traffic direction of each of the first plurality of intersecting points includes one of: a left traffic direction and a right traffic direction;
determining a traffic direction of each of the second plurality of intersecting points, wherein the traffic direction of each of the second plurality of intersecting points includes one of: the left traffic direction and the right traffic direction; and
identifying the first point and the second point, wherein the first point is one of the first plurality of intersecting points having the left traffic direction and the second point is one of the second plurality of intersecting points having the left traffic direction.

6. The method of claim 1, wherein forming the fused lane line map further comprises:
plotting a lane line between each of the plurality of fused points, wherein the lane line is substantially parallel to the road segment.

7. A system for merging lane line maps for a vehicle, the system comprising:
a camera system;
an automated driving system;
a vehicle communication system; and
a vehicle controller in electrical communication with the camera system, the automated driving system, and the vehicle communication system, wherein the vehicle controller is programmed to:
generate a first lane line map of a road segment in an environment surrounding the vehicle using the camera system;
receive a second lane line map of the road segment using the vehicle communication system;
identify a plurality of fused points based at least in part on the first lane line map and the second lane line map, wherein to identify the plurality of fused points, the vehicle controller is further programmed to:
determine a plurality of virtual lateral lines, wherein each of the plurality of virtual lateral lines is perpendicular to the road segment, and wherein the plurality of virtual lateral lines are evenly spaced along a length of the road segment;
determine a plurality of corresponding point pairs, wherein each of the plurality of corresponding point pairs includes a first point and a second point, and wherein each of the plurality of corresponding point pairs corresponds to one of the plurality of virtual lateral lines; and
fuse each of the plurality of corresponding point pairs to form the plurality of fused points, wherein each of the plurality of fused points is located between the first point and the second point of one of the plurality of corresponding point pairs;
form a fused lane line map based at least in part on the plurality of fused points; and
control a path of the vehicle using the automated driving system based at least in part on the fused lane line map.

8. The system of claim 7, wherein to determine one of the plurality of corresponding point pairs, the vehicle controller is further programmed to:
select a first of the plurality of virtual lateral lines;
shift a subset of a plurality of points of the first lane line map towards a plurality of points of the second lane line map based at least in part on the first of the plurality of virtual lateral lines;
identify a first plurality of intersecting points, wherein each of the first plurality of intersecting points is one of the plurality of points of the first lane line map, and wherein each of the first plurality of intersecting points intersects with the first of the plurality of virtual lateral lines;
identify a second plurality of intersecting points, wherein each of the second plurality of intersecting points is one of the plurality of points of the second lane line map, and wherein each of the second plurality of intersecting points intersects with the first of the plurality of virtual lateral lines; and
determine the one of the plurality of corresponding point pairs based at least in part on the first plurality of intersecting points and the second plurality of intersecting points, wherein the first point of the one of the plurality of corresponding point pairs is from the first plurality of intersecting points and the second point of the one of the plurality of corresponding point pairs is from the second plurality of intersecting points, and wherein a distance between the first point and the second point is less than or equal to a predetermined corresponding point pair distance threshold.

9. The system of claim 8, wherein to shift the subset of the plurality of points of the first lane line map, the vehicle controller is further programmed to:
select the subset of the plurality of points of the first lane line map, wherein each of the subset of the plurality of points of the first lane line map is within a circle centered at one of the plurality of virtual lateral lines; and
shift the subset of the plurality of points of the first lane line map towards the plurality of points of the second lane line map using an iterative closest point algorithm, wherein the subset of the plurality of points of the first lane line map is only shifted along a lateral axis, and wherein the lateral axis is parallel to the one of the plurality of virtual lateral lines.

10. The system of claim 8, wherein to determine the one of the plurality of corresponding point pairs, the vehicle controller is further programmed to:
determine a traffic direction of each of the first plurality of intersecting points, wherein the traffic direction of each of the first plurality of intersecting points includes one of: a left traffic direction and a right traffic direction;
determine a traffic direction of each of the second plurality of intersecting points, wherein the traffic direction of each of the second plurality of intersecting points includes one of: the left traffic direction and the right traffic direction; and
identify the first point and the second point, wherein the first point is one of the first plurality of intersecting points having the left traffic direction and the second point is one of the second plurality of intersecting points having the left traffic direction.

11. A system for merging lane line maps for a vehicle, the system comprising:
a server system, the server system including:
a server communication system; and
a server controller in electrical communication with the server communication system, wherein the server controller is programmed to:

receive a first lane line map and a second lane line map of a road segment using the server communication system;

identify a plurality of fused points based at least in part on the first lane line map and the second lane line map, wherein to identify the plurality of fused points, the server controller is further programmed to:

determine a plurality of virtual lateral lines, wherein each of the plurality of virtual lateral lines is perpendicular to the road segment, and wherein the plurality of virtual lateral lines are evenly spaced along a length of the road segment;

determine a plurality of corresponding point pairs, wherein each of the plurality of corresponding point pairs includes a first point and a second point, and wherein each of the plurality of corresponding point pairs corresponds to one of the plurality of virtual lateral lines, wherein to determine one of the plurality of corresponding point pairs, the server controller is further programmed to:

select a first of the plurality of virtual lateral lines;

shift a subset of a plurality of points of the first lane line map towards a plurality of points of the second lane line map based at least in part on the first of the plurality of virtual lateral lines;

identify a first plurality of intersecting points, wherein each of the first plurality of intersecting points is one of the plurality of points of the first lane line map, and wherein each of the first plurality of intersecting points intersects with the first of the plurality of virtual lateral lines;

identify a second plurality of intersecting points, wherein each of the second plurality of intersecting points is one of the plurality of points of the second lane line map, and wherein each of the second plurality of intersecting points intersects with the first of the plurality of virtual lateral lines; and determine the one of the plurality of corresponding point pairs based at least in part on the first plurality of intersecting points and the second plurality of intersecting points, wherein the first point of the one of the plurality of corresponding point pairs is from the first plurality of intersecting points and the second point of the one of the plurality of corresponding point pairs is from the second plurality of intersecting points, and wherein a distance between the first point and the second point is less than or equal to a predetermined 1 point pair distance threshold; and generate a plurality of fused points, wherein each of the plurality of fused points is located between the first point and the second point of one of the plurality of corresponding point pairs;

form a fused lane line map based at least in part on the plurality of fused points; and transmit the fused lane line map using the server communication system; and a vehicle system, the vehicle system including:
a vehicle communication system;
an automated driving system; and
a vehicle controller in electrical communication with the vehicle communication system and the automated driving system, wherein the vehicle controller is programmed to:
receive the fused lane line map from the server system using the vehicle communication system; and
control a path of the vehicle using the automated driving system based at least in part on the fused lane line map.

\* \* \* \* \*